(12) United States Patent
Leary et al.

(10) Patent No.: US 9,520,604 B2
(45) Date of Patent: Dec. 13, 2016

(54) SLIP STREAM FOR RELIABLE ANODE TO CATHODE FLOW IN FREEZE CONDITIONS

(71) Applicant: GM Global Technology Operations LLC, Detroit, MI (US)

(72) Inventors: James K. Leary, Rochester, NY (US); Bruce J. Clingerman, North Rose, NY (US); Ronald J. Daum, Bloomfield, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 380 days.

(21) Appl. No.: 14/193,144

(22) Filed: Feb. 28, 2014

(65) Prior Publication Data

US 2014/0272650 A1    Sep. 18, 2014

Related U.S. Application Data

(60) Provisional application No. 61/788,655, filed on Mar. 15, 2013.

(51) Int. Cl.
*H01M 8/04* (2016.01)
*B60L 11/18* (2006.01)
*H01M 8/10* (2016.01)

(52) U.S. Cl.
CPC ...... *H01M 8/04253* (2013.01); *B60L 11/1885* (2013.01); *H01M 8/04201* (2013.01); *H01M 8/04223* (2013.01); *H01M 8/04225* (2016.02); *H01M 8/04228* (2016.02); *H01M 2008/1095* (2013.01); *H01M 2250/20* (2013.01); *Y02E 60/50* (2013.01); *Y02T 90/32* (2013.01); *Y02T 90/34* (2013.01)

(58) Field of Classification Search
CPC ............... H01M 8/04223; H01M 8/04225; H01M 8/04228; H01M 8/04253
See application file for complete search history.

(56) References Cited

U.S. PATENT DOCUMENTS

| | | | |
|---|---|---|---|
| 2,439,458 A * | 4/1948 | Eaton | B64D 15/16 137/59 |
| 5,082,240 A * | 1/1992 | Richmond | F16K 31/404 138/45 |
| 5,371,132 A | 12/1994 | Ebara et al. | |
| 5,413,309 A * | 5/1995 | Giesler | F16K 24/02 137/614.06 |
| 7,887,963 B2 | 2/2011 | Kocha | |
| 2008/0241606 A1 | 10/2008 | Gallagher | |
| 2009/0193974 A1 | 8/2009 | Montie et al. | |
| 2013/0252123 A1* | 9/2013 | Patterson | H01M 8/04253 429/429 |

FOREIGN PATENT DOCUMENTS

CN    102005590 A    4/2011

\* cited by examiner

*Primary Examiner* — Nicholas A Smith
(74) *Attorney, Agent, or Firm* — Quinn Law Group PLLC (57) ABSTRACT

A device and method for ensuring proper fuel cell system warmup or shutdown during freeze conditions. A three-way valve is used in conjunction with a flow-controlling orifice to ensure that the orifice avoids ice blockage during frozen conditions. Dry, warm air is delivered as a slip stream under pressure to a cathode flowpath, where the construction of the orifice is such that it is structurally compliant to promote flexing in response to the pressurized slip stream, thereby helping to break up any small amount of ice that may have formed in or on the orifice.

20 Claims, 6 Drawing Sheets

SLIP STREAM FOR RELIABLE ANODE TO CATHODE FLOW IN FREEZE CONDITIONS

CROSS-REFERENCE TO RELATED APPLICATION

This application claims the benefit of U.S. Provisional Application Ser. No. 61/788,655, filed Mar. 15, 2013.

FIELD

This application relates generally to a device and method for ensuring proper fuel cell system warmup or shutdown during freeze conditions. More specifically, the application relates to a three-way valve used in conjunction with a flow-controlling orifice to ensure that the orifice avoids ice blockage during frozen conditions, where dry, warm air can be delivered as a slip stream under pressure to a cathode flowpath, where the construction of the orifice is such that it is structurally compliant to promote flexing in response to the pressurized slip stream, thereby helping to break up any small amount of ice that may have formed in or on the orifice.

BACKGROUND OF THE INVENTION

This invention relates generally to improvements in fuel cell operability during conditions where moisture-prone components are exposed to temperatures where water may freeze, and more particularly to a fuel cell system and method for selectively routing a cathode slip stream to reduce the likelihood of frozen water blockage of the fuel cell during cold weather starts.

Fuel cells convert a fuel into usable electricity via chemical reaction. A significant benefit to such an energy-producing means is that it is achieved without reliance upon combustion as an intermediate step. As such, fuel cells have several environmental advantages over internal combustion engines (ICEs) and related power-generating sources. In a typical fuel cell (such as a proton exchange membrane or polymer electrolyte membrane—in either event, PEM—fuel cell), a pair of catalyzed electrodes are separated by an ion-transmissive medium in the form of a polysulfonated membrane (such as Nafion™) such that an electrochemical reaction may occur when an ionized form of a reducing agent (such as hydrogen, $H_2$) introduced through one of the electrodes (the anode) crosses the ion-transmissive medium and combines with an ionized form of an oxidizing agent (such as oxygen, $O_2$) that has been introduced through the other electrode (the cathode). Upon combination at the cathode, the ionized hydrogen and oxygen form water. The electrons that were liberated in the ionization of the hydrogen proceed in the form of direct current (DC) to the cathode via external circuit that typically includes a load. The flow of this DC energy is the basis for power generation by the fuel cell.

The PEM fuel cell stack needs to run during varying ambient environmental conditions, including those that are cold, wet or both. Left unchecked, such conditions may hamper effective fuel cell startup and shutdown. For example, during shutdown, a certain amount of water (much of which may have been generated during operation of the fuel cell system) has to be removed to ensure that ice blockage of key flowpaths is avoided and that a subsequent startup, warm-up, and drive-away is still possible even after the system has been exposed to freezing conditions. Removing water from the fuel cell's anode loop is especially difficult as it doesn't have the high gas volume and flow velocity that the cathode loop does as a way to purge any excess water. One way to facilitate anode loop water evacuation is by drawing the water directly through the ion-transmissive medium of the various fuel cells toward the cathode. Unfortunately, this is a fairly slow process (often taking over a minute to drop anode water content to an appreciable level). This approach can also lead to excessive membrane drying out, which may adversely impact the durability of the individual fuel cells.

Another way to reduce or eliminate the chance of such flowpath ice formation is to allow some of the hydrogen from the anode loop to be introduced into the cathode loop during fuel cell system shutdown and startup; such an approach may be effected through a valve placed between the anode and cathode loops and allowed to remain open long enough (possibly for only a few seconds) to promote the hydrogen flow. During the shutdown, the valve provides a quicker path for water to leave the anode instead of the slow method of drawing water through the ion-transmissive medium. During the startup, this catalytic reaction of hydrogen and oxygen (in addition to possibly helping reduce open circuit voltage (OCV)) produces heat that may be used to raise the temperature of adjacent flowpaths and components. While this approach is more capable of promoting prompt, efficient warmup of a fuel cell system that has been exposed to freezing conditions, the relatively large thermal mass of the valve itself makes it susceptible to ice formation and related blockage. Moreover, such valves typically include a flow-regulating opening (in the form of an orifice) that by virtue of its precisely known size is used to provide precise measurement or control functions. Unfortunately, the size and precision needed to establish its flow-regulating function also make the orifice particularly susceptible to the types of ice blockage associated with the remainder of the valve as discussed above.

SUMMARY OF THE INVENTION

Specific embodiments provided herein describe a device for improving fuel cell system startup or shutdown, said device comprising: a three-way valve fluidly cooperative with at least one anode of said fuel cell system to receive to a hydrogen-bearing fluid therefrom, said valve configured to permit selective passage of at least one of said hydrogen-bearing fluid and a pressurized slip stream fluid therethrough; and a flow controlling orifice fluidly cooperative with said three-way valve to deliver a metered quantity of said slip stream fluid, said orifice configured of a flexible construction such that in an environmental condition where water present in said fuel cell system is exposed to freezing temperature, said orifice is responsive to the enhanced pressure of said slip stream fluid such that any frozen water situated thereon is removed by a flexing action of said orifice in response to said passage of said slip stream therethrough.

Additional specific embodiments provided herein describe a fuel cell system comprising: a fuel cell stack comprising a plurality of fuel cells each of which comprises an anode to accept a hydrogen-bearing fluid, a cathode to accept an oxygen-bearing fluid and a medium cooperative with said anode and said cathode to pass at least one catalytically-ionized reactant therebetween; an anode flowpath in fluid communication with said anode; a cathode flowpath in fluid communication with said cathode; and a three-way valve fluidly cooperative with said anode flowpath and said cathode flowpath, said valve comprising: at least one actuation mechanism to establish selective introduction of said hydrogen-bearing fluid from said anode flowpath into said cathode flowpath; and a flow controlling orifice configured to control anode flow into said cathode flowpath such that in an environmental condition where water present in said flowpath and valve may be frozen, said orifice is responsive to the enhanced pressure of said slip stream fluid such that any frozen water situated thereon is removed by a flexing action of said orifice in response to said passage of said slip stream therethrough.

Yet additional specific embodiments provided herein describe a method of operating a fuel cell system, said method comprising: configuring a valve to be fluidly cooperative with an anode flowpath and a cathode flowpath of said fuel cell system, said valve comprising at least one actuation mechanism and a flow controlling orifice; passing a pressurized slip stream through said orifice such that in an environmental condition where water present in at least one of said anode flowpath, cathode flowpath and valve may be frozen, said orifice flexes in response to the enhanced pressure of said slip stream such that any frozen water situated thereon is removed by said flexing; and introducing a hydrogen-bearing fluid to said cathode flowpath from said anode flowpath through said at least one actuation mechanism and said orifice.

BRIEF DESCRIPTION OF THE DRAWINGS

The following detailed description of specific embodiments can be best understood when read in conjunction with the following drawings, where like structure is indicated with like reference numerals and in which.

The embodiments set forth in the drawings are illustrative in nature and are not intended to be limiting of the embodiments defined by the claims. Moreover, individual aspects of the drawings and the embodiments will be more fully apparent and understood in view of the detailed description that follows.

DETAILED DESCRIPTION OF THE PREFERRED EMBODIMENTS

Figure 1A:
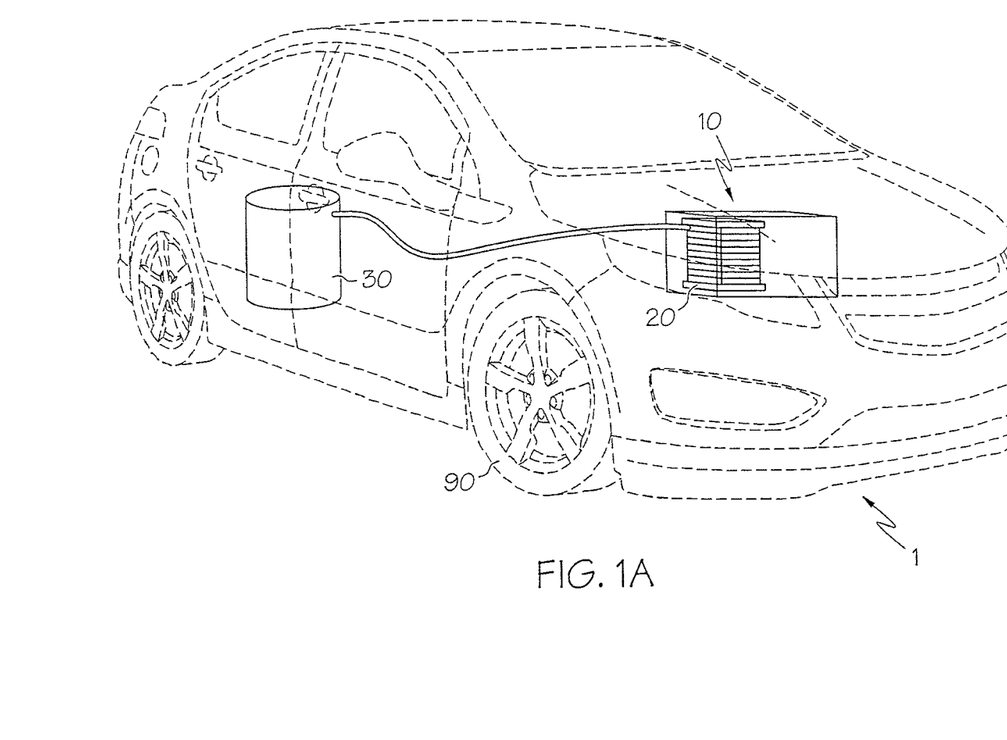
FIG. 1A shows a vehicle having a fuel cell system with at least one fuel cell stack.
Figure 1B:
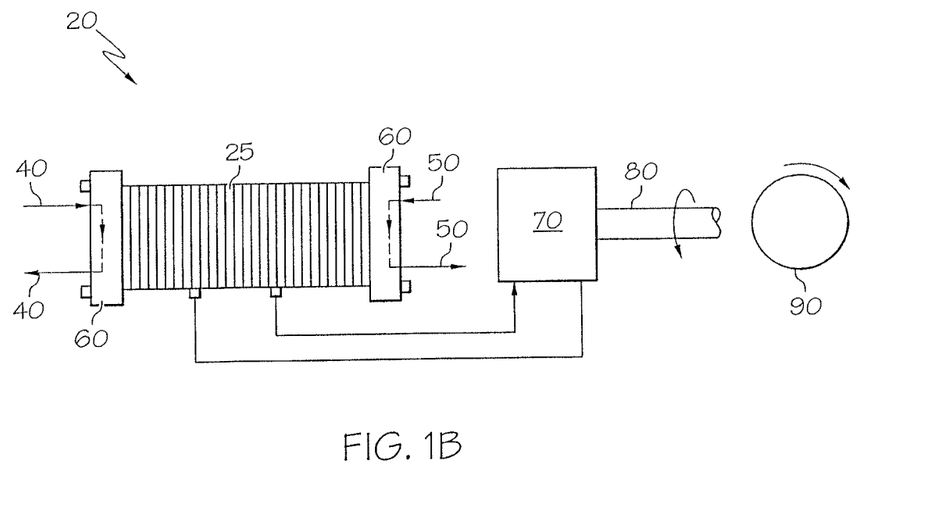
FIG. 1B shows a schematic illustration of the interrelation between the fuel cell stack and a drivetrain of the vehicle of FIG. 1A.
Figure 1C:
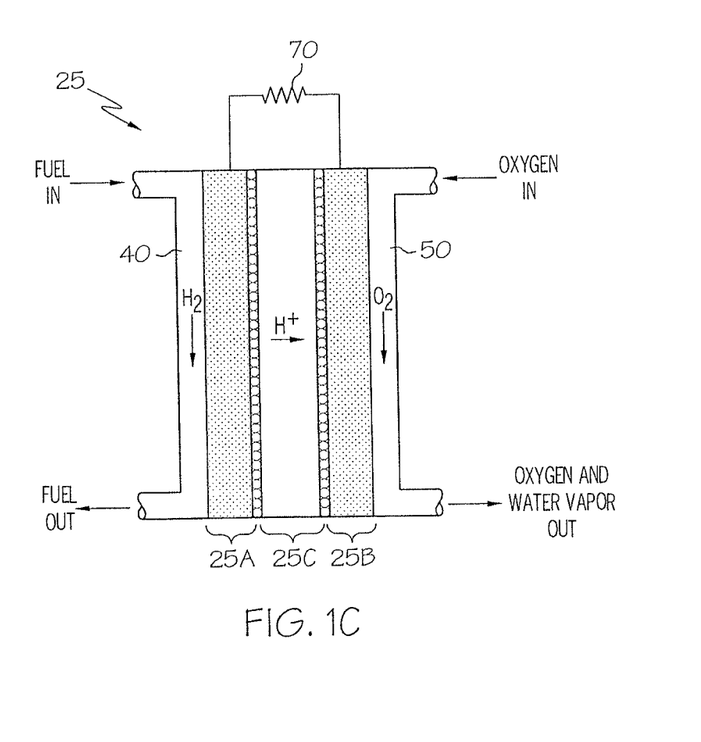
FIG. 1C shows a representative single fuel cell that is used to make up the fuel cell stack of FIG. 1B.

Referring first to FIGS. 1A through 1C, a vehicle 1 includes a propulsion source in the form of a fuel cell system 10 with one or more fuel cell stacks 20 being supplied with fuel from one or more tanks 30. In one form, the fuel is in the form of a hydrogen-based first reactant. The second reactant (for example, an oxygen-based fluid) may be supplied from the ambient environment. Either or both reactants may be supplied to the fuel cell system 10 in pressurized form, such as by a compressor, pump or related device (not shown). Although not shown, an additional propulsion source, such as a conventional internal combustion engine (ICE) or a battery pack may also be used to give the vehicle 1 hybrid propulsion attributes.

Still referring to FIGS. 1A through 1C, Fuel cell stack 20 is made up of numerous individual fuel cells 25 that are in turn made up of an anode 25A, cathode 25B and a proton-transmissive membrane 25C. A first reactant flowpath 40 acts as a conduit to convey a hydrogen-bearing fluid to and from the anode 25A, while a second reactant flowpath 50 does the same with an oxygen-bearing fluid at cathode 25B. Manifolds 60 may be disposed at opposing ends of stack 20 to coordinate the delivery and removal of the reactants through the conduits 40, 50. Energy storage devices 70 can be in the form of a load made up of one or more batteries, capacitors, electricity converters, or even a motor to convert the electric current coming from the fuel cell stack 20 into rotating shaft power that can be used to operate a drivetrain 80 and one or more motive devices (such as a wheel) 90. The energy storage devices 70 are not necessary to the operation of the system 1, and may be done away with a certain configurations. In one particular configuration, the fuel cells 25 are PEM fuel cells, and while the present invention is especially applicable to the PEM configuration, the use of other fuel cell configurations with the present invention is also within the purview of the present disclosure. Together, the anode 25A cathode 25B and membrane 25C define a membrane electrode assembly (MEA).

Figure 2:
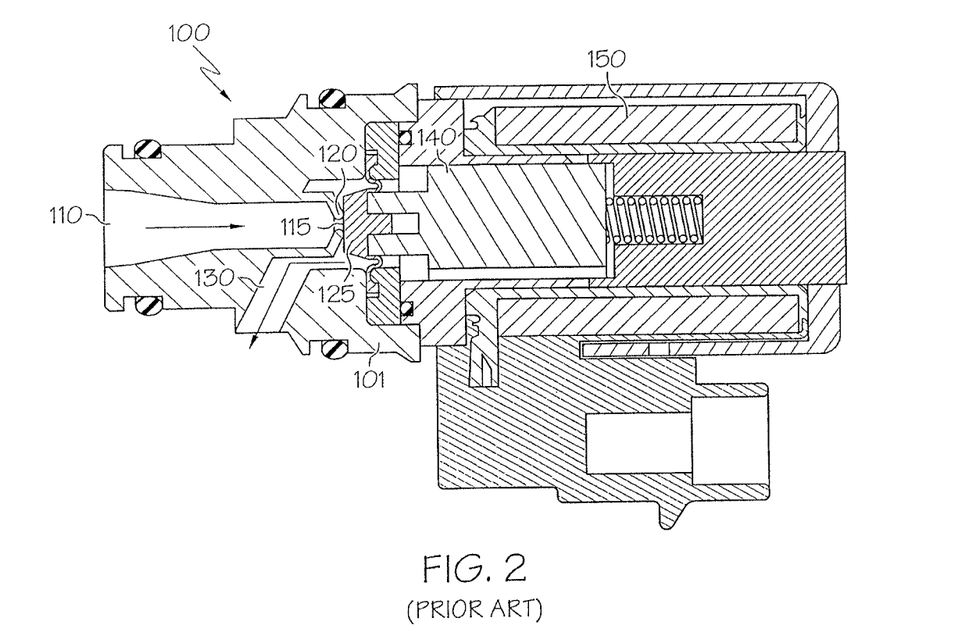
FIG. 2 shows a solenoid valve used to selectively combine reactants in a cathode stack inlet for subsequent catalytic purging of active reactants according to the prior art.

Referring next to FIG. 2, a solenoid version of valve 100 according to the prior art is shown. During normal operation (for example, when the fuel cell system 20 is operating to produce current to propel or otherwise provide power to vehicle 1), valve 100 remains closed to prevent a hydrogen-bearing fluid in anode outlet flowpath 110 that is connected to an outlet of the anodes 25A of fuel cell stack 25. A flow-controlling orifice 120 is used to permit the passage of hydrogen such that flow control may be maintained. The center 115 of a hole of the orifice 120 is shown. An embodiment of a pintle 125 is also shown. An example of such a metering configuration may be found in published application METHODS AND CONTROLS FOR HYDROGEN TO CATHODE INLET OF A FUEL CELL SYSTEM, App. Num. 20100151284, Burch: Steven D.; et al., Jun. 17, 2010 that is owned by the Assignee of the present invention and incorporated in its entirety by reference. To alternate between being opened and closed (the latter of which is presently shown), a current passing through coil 150 creates magnetic flux paths that act as an electromagnet on a plunger 140, causing it to overcome its spring bias and move in a linear path away from the orifice-containing seat such that an open fluid path is formed from the anode outlet flowpath 110 to a cathode inlet flowpath 130. The presence of a significant amount of relatively dense materials (such as iron and its steel derivatives) in housing 101 of valve 100 acts as a large thermal mass such that in temperature extremes, it tends to hold in latent form whatever heat or cold it has been exposed to for a significantly longer period than its ambient environment counterpart. As such, under freezing conditions, valve 100 (especially housing 101) has a tendency to freeze any adjacent residual water and small fluid passageways. This can be particularly disruptive to orifice 120 (with its small, finely-tuned passageway), as relatively small amounts of frozen water would be able to freeze and plug up the orifice 120, thereby stopping operation of the fuel cell system 20 that depends on the metered flow passing through the orifice 120 for normal operation.

One purpose of introducing a hydrogen-bearing fluid from the anode flowpath into the cathode flowpath is to catalytically react ionized hydrogen and oxygen as a way to reduce open cell voltage (OCV) that may (if left unchecked) lead to premature degradation of voltage-sensitive fuel cell components, such as the catalysts used at the fuel cell's anode and cathode. This approach is especially useful during startup and shutdown conditions. One such approach is discussed in U.S. Pat. No. 7,887,963 that is owned by the Assignee of the present invention. This also has the benefit of warming up the flowpaths carrying the fluid containing the catalytically-combined reactants. Nevertheless, it would be beneficial to avoid having to run the humidified hydrogen-bearing fluid through the valve 100, especially in situations where the valve 100 is cold, making the orifice 120 vulnerable to freeze.

Figure 3:
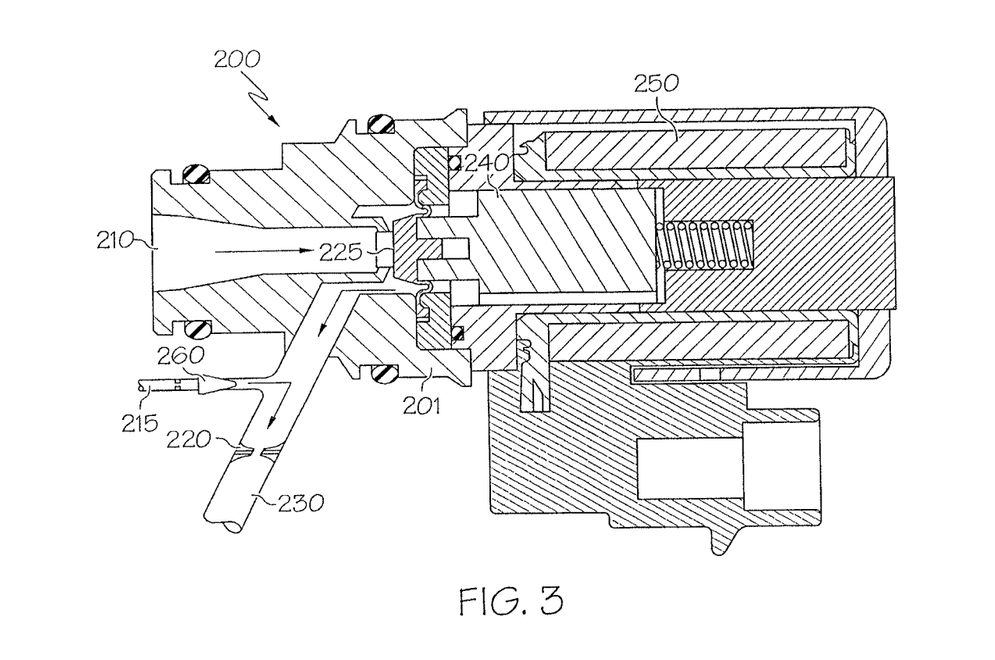
FIG. 3 shows a two-way solenoid valve used to selectively combine reactants in a cathode stack inlet for subsequent catalytic purging of active reactants according to an aspect of the present invention. Specific embodiments of FIG. 3 show a 2-way valve with an added slip stream line 215 with a check valve 260, specifically a duckbill style check valve that can work by maintaining a higher anode pressure than a cathode pressure.

Referring next to FIG. 3, a two-way solenoid valve 200 in combination with a check valve 260 combination according to the present invention is shown. The commanded position of valve 200 controls the flow of two separate fluid paths the first of which couples an anode outlet flowpath (also referred to herein as anode flowpath) 210 and a cathode inlet flowpath 230 (also referred to herein as cathode flowpath) and the second of which introduces a slip stream (also referred to as a slip stream fluid) 215 into the cathode inlet flowpath 230. In a preferred form, the slip stream 215 is delivered in pressurized form from a compressor (not shown), while in a more particular form, the slip stream is delivered as bleed air from an oxygen-bearing flowpath that is used to provide reactant to the cathodes of the various cells 25 of fuel cell stack 20. The slip stream fluid that passes through slip stream 215 is lower in humidity than the fluid entering valve 200 from the anode side of the fuel cell stack 20. A backflow-prevention valve (for example, a check valve 260) may be included in the conduit that defines the flowpath for the slip stream 215 to minimize the chance of backflow during hydrogen flow operation. In the two-way valve 200 implementation, the check valve 260 between the compressor (not shown) and the valve 200 may not be necessary, where situating the orifice 220 downstream provides two benefits: first, allowing the fluid from slip stream 215 to flow through it to keep it clear, and second to reduce or eliminate thermal coupling the orifice 220 and the thermal mass of the valve 200. Likewise, in another configuration, the slip stream 215 flows through the valve 200, which could potentially allow the orifice 220 to remain in the valve 200, saving the cost of extra hardware. The three way valve 200, however, can also be implemented with the orifice 220 in the downstream position (as shown) if required (eg. cold valve effect is stronger than the slipstream effect). A specific embodiment of a pintle 225 is also shown.

In a preferred form, valve 200 is made up of numerous components, including one or more actuation mechanisms (such as a plunger or plug, both as discussed in more detail below) used to establish selective introduction of a hydrogen-bearing fluid from the anode outlet flowpath 210 into the cathode inlet flowpath 230 and a flow controlling orifice 220. Preferably, the orifice 220 is made from a material that remains structurally-compliant over an expected temperature range of fuel cell system 20, including the freezing conditions mentioned above. Such structural compliance allows the orifice to flex in response to a pressurized fluid (such as slip stream 215 being passed through it. This ability to flex makes it easier for any residual frozen water that may have deposited onto orifice 220 to be broken up such that it readily flakes off.

As discussed above, water removal from a fuel cell anode loop is hampered by the low volume and low flow velocity in that loop. The present inventors have additionally discovered that this problem is especially acute in configurations that employ a recirculation-based anode flowpath, where some of the excess hydrogen that would otherwise be exhausted from the system is rerouted to the inlet of the fuel cell anode. Such an approach is helpful in reducing hydrogen emissions from the fuel cell system, but tends to produce a higher moisture content in the fluid exiting the fuel cell, as well as in the anode flowpath to the cathode.

In one form (as shown in FIG. 3), the orifice 220 may be located downstream and away from the valve 200. This is because the housing 201 of valve—which is cold in freeze conditions and draws water to it during a prior fuel cell system 20 cooldown in a manner similar to that of housing 101 of the valve 100 of FIG. 2)—should be kept away from the freeze-prone orifice 220. As discussed elsewhere in this disclosure, the orifice 220 is made of a thin, flexible material to promote the shedding of any ice that does form on the orifice 220 during a period of cold soak (such as being placed in a vehicle that is exposed to freezing weather conditions for extended periods). As such, the flexible nature of the orifice 220 is such that the flow and pressure associated with compressor startup helps any built-up ice to break free (in a manner generally analogous to removing ice cubes from a plastic tray by flexing it).

Figure 4A:
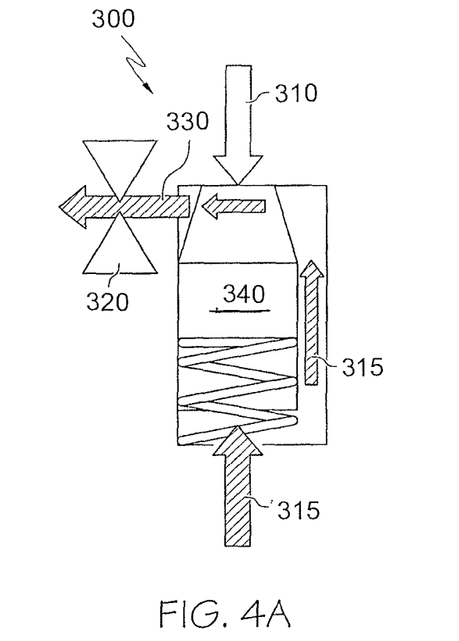
FIG. 4A shows a schematic of a three-way plug valve in a first operational state with hot and dry compressor airflow 315 clearing water out of the orifice 320.
Figure 4B:
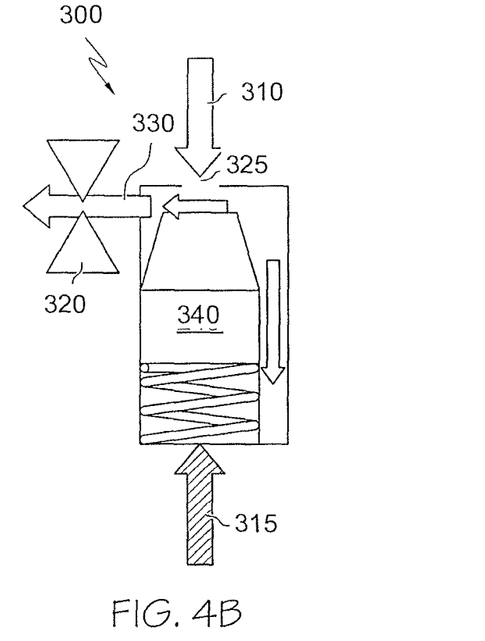
FIG. 4B shows a schematic of the valve of FIG. 4A in a second operational state where the valve is used to selectively combine reactants in a cathode stack inlet for subsequent catalytic purging of active reactants 310 according to an aspect of the present invention.

Referring next to FIGS. 4A, 4B, 5A and 5B, two different embodiments of the present three-way valve 300 are shown in schematic detail. In particular, the embodiment depicted in FIGS. 4A and 4B corresponds to a linear valve construction that could function like the solenoid version depicted in FIG. 3. While the orifice 320 can either be part of the valve 300 in general and situated within the housing in particular, it is preferably remotely located as shown. This is advantageous in that it can be easily exchanged or modified with minimal disruption to the remainder of the system in general and valve 300 in particular. The present inventors emphasize that such remote, downstream placement of the orifice 320 from valve may not be necessary in situations where either (a) adequate thermal isolation may be established between the orifice 320 and the housing, or (b) where the temperature conditions (including the low temperature conditions imposed by the housing are not sufficient to freeze-harden the orifice 320. A specific embodiment a port 325 is also shown in FIG. 4B. In specific embodiments the orifice 220 and orifice 320 are the same size. In specific embodiments some or all passageways are larger than the orifices 220/320.

Figure 5A:
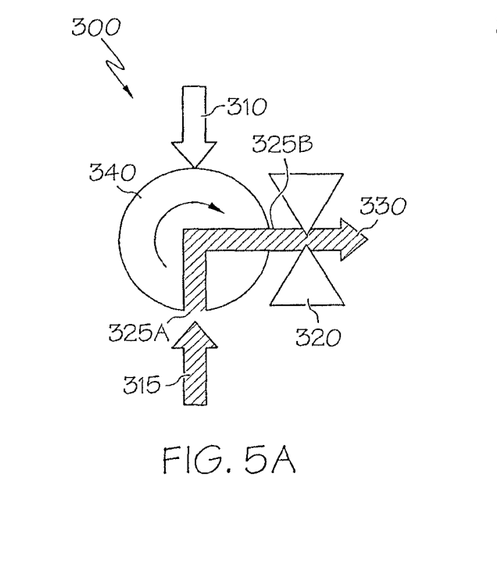
FIG. 5A shows a schematic of the three-way solenoid valve of FIG. 3 in a first operational state.
Figure 5B:
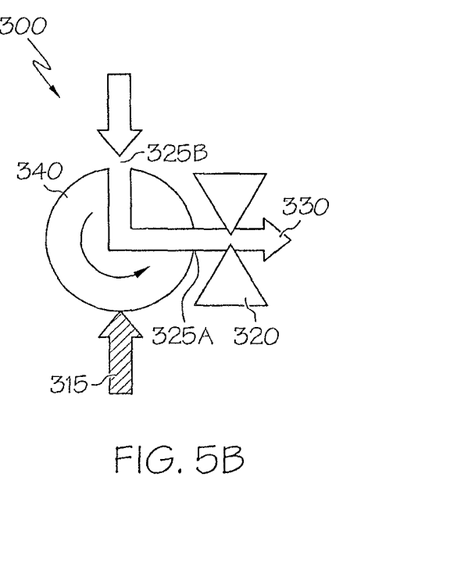
FIG. 5B shows a schematic of the valve of FIG. 5A in a second operational state.

Referring with particularity to FIGS. 5A and 5B, the device is configured as a three-way plug valve 300, where rotation of a spherical-shaped plug 340 allows selective passage from one or the other of a first port 325A and a second port 325B into the other; in this way, the ports 325A, 325B may alternatively acts as fluid inlets or outlets, depending on the position of plug 340. Thus, when the plug 340 of the three-way valve 300 is in a first position that corresponds to normal operation of the fuel cell system 20, slip stream 315 passes through first port 325A and the passageway formed in plug 340 to the second port 325B to then pass through the orifice 320 and enter the cathode flowpath 330. When the plug 340 of the three-way valve 300 is in a second position that corresponds to bleed operation of the fuel cell system 20, humidified hydrogen 310 passes through first port 325B and the passageway formed in plug 340 to the second port 325A to then pass through the orifice 320 and enter the cathode flowpath 330.

Figure 6:
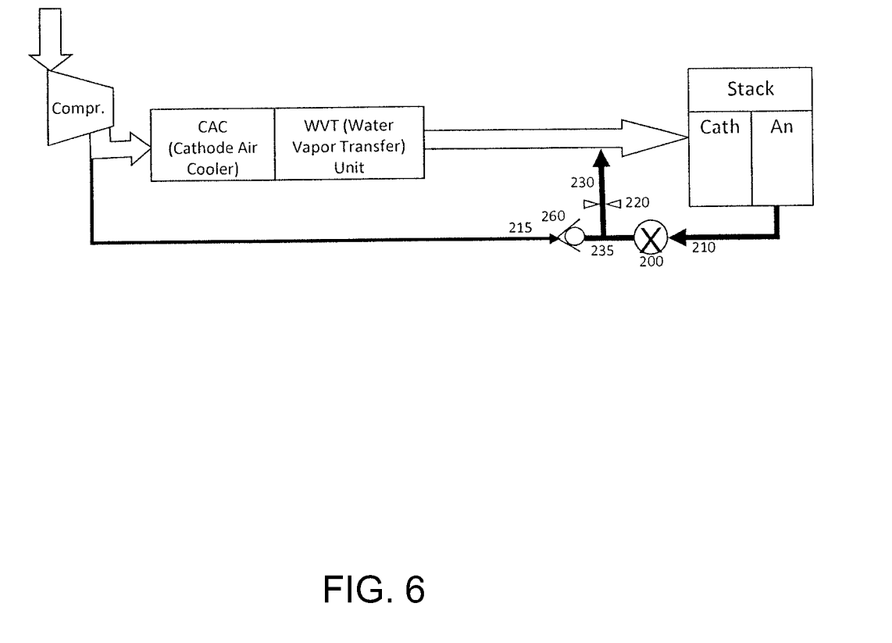
FIG. 6 shows two example modes of operation of embodiments using a 2-way valve.

Referring now to FIG. 6, FIG. 6 illustrates two example modes of operation of embodiments using a 2-way valve: 1) When flowing anode to cathode (wet stream): The 2-way valve opens and anode gas flows from 210, through 200, into the pintle 225 (See FIG. 2), and down past the orifice 220 to get to the cathode inlet via 230 line. The check valve 260 can prevent anode flow from going to the compressor out port (where 215 originates). In specific embodiments the check valve 260 is needed for the following reasons: Controlling the anode to cathode flow accurately is very important. This can be done by controlling the delta pressure (dP) between the anode and cathode side of the stack. When valve 200 opens, the main pressure drop occurs across the orifice 220. The orifice 200 has a known, precise effective area. If anode could get to the cathode by both paths (215 and 230), it would be harder to predict the precise flow given the dP. The two paths in parallel would have a much greater part-to-part manufacturing variance compared to a pressure drop on one path with a carefully manufactured orifice. In addition, allowing humidified anode flow to enter the slipstream line 215 can result in the line freezing, and the slipstream function being disabled. During anode flow, the pressure in chamber 235 is higher than the pressure in 215 (remember that anode pressure is kept above cathode pressure), so the duckbill check valve closes, preventing flow from anode to 215. It forces all anode flow through 220. An unfortunate side effect is that this flow is humidified, so water can end up on 200. In a second example of specific embodiments, still referring to FIG. 6, when not flowing anode to cathode: During the times that the humidified anode stream is not flowing through the orifice 220 (when valve 200 is closed), there is a need to remove any water that got on the orifice during the wet anode flow. So when the 2-way valve (200) shuts, the pressure goes down in the chamber (pintle). Since there is a pressure drop across the CAC and WVT, the pressure at 230 is lower than the pressure at 215. This lets a small amount of air to be diverted from the mainstream airflow around the CAC and WVT, past the check valve 260, and through orifice 220 back into the cathode stream. Since the air out of the compressor is hot and dry, it works well to dry out the orifice 220.

In one form, the two-way valve 200 configuration may be used to overcome backflow humidity by adding the check valve. In one form, such a configuration may be used to eliminate the possibility of slip stream freeze-up due to wet gas backflow. In another form, the three-way valve 300 may be used to overcome backflow humidity without adding a check valve. The geometry of the three-way valve closes off the slip stream pathway 315 during the hydrogen flow operation.

Figure 7:
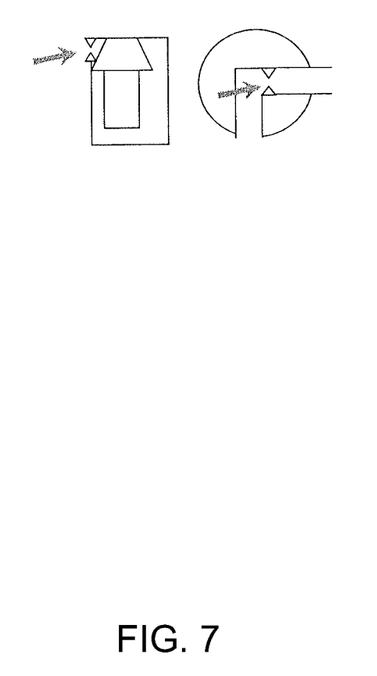
FIG. 7 shows an example embodiment of a three-way valve configuration with an orifice (arrows).

FIG. 7 shows an example embodiment of a three-way valve configuration with an orifice (arrows). The orifice in specific embodiments can be internal to the valve. The components (including the orifice) in FIG. 7 are, in specific embodiments, the same size as those in FIGS. 4 and 5, and in other embodiments can be different in size.

According to one aspect of the invention, a device for ensuring proper fuel cell system warm-up during freeze conditions is disclosed. The device is configured such that the freeze-susceptible controlling orifice is used in conjunction with a two-way valve and a check valve combination, or a three-way valve to ensure that the orifice avoids ice blockage during frozen conditions. In particular, the device is configured such that a dry, warm air stream is introduced from the outlet of a compressor that is used to deliver pressurized cathode reactant to the fuel cell system so that this air forms a slip stream that is introduced fluidly upstream of the orifice such that upon passing through it, helps keep it clear of water that could otherwise form flowpath-blocking ice. Within the context of the present invention, this slip stream (also called "slip stream air", "slip stream fluid" or the like) is that which flows around the normal airflow path that passes through the valve. Thus, in one form, this compressed air introduction takes place when the 2-way valve is closed and the check valve opens from the pressure differential across it. In addition to being warmed by the compressed slip stream air, the orifice can be made to be structurally compliant such that upon the passage of the slip stream, the orifice will flex, thereby helping to break up any small amount of ice that may have formed or remains thereon. In a particular form, the valve is configured as a three-way device; such a configuration, when used in conjunction with a slip stream prevents backflow of compressor outlet air from flowing to the anode loop. In specific embodiments the three way valve prevents backflow because it cuts off the actual slipstream path when it opens the bleed path; only one path at a time can be active. In specific embodiments of the two way valve in combination with the check valve (FIG. 3), the check valve prevents hydrogen from backflowing to the compressor outlet. In specific embodiments the bleed valve is shut during slipstream flow preventing backflow of air to the anode.

Again referring to specific embodiments of FIG. 3: in embodiments where the check valve 260 is removed, then the humidified anode (hydrogen bearing) gas can go from 210 to both 230 and 215. In specific embodiments if enough water gets in the 215 line, it may not clear out during the short time in shutdown after valve 200 is closed; then it can freeze the slip stream passage shut for the next startup; the check valve can prevent any flow from 210 to 215; similarly, in the three way valve configurations, the slipstream line 315 can in specific embodiments be blocked off when the bleed flow is active. In addition to improving freeze condition startup reliability, such a system has the potential to lower shutdown purge time and energy, thereby improving cold weather winter fuel economy for a vehicular-based fuel cell system.

According to specific aspects of the present invention, a fuel cell system is disclosed. The system includes a fuel cell stack made up of numerous fuel cells each of which comprises an anode to accept a hydrogen-bearing fluid, a cathode to accept an oxygen-bearing fluid and a medium (such as the aforementioned proton exchange membrane or polymer electrolyte membrane) cooperative with the anode and the cathode to pass at least one catalytically-ionized reactant between them. The system additionally includes an anode flowpath and a cathode flowpath to act as a conduit to deliver their respective fluids. A three-way valve made up of one or more actuation mechanisms and a flexibly-configured flow-controlling orifice. The valve is included in the system to establish selective introduction of hydrogen-bearing fluid from the anode flowpath into the cathode flowpath, or slipstream flow from the compressor outlet through the orifice, while the orifice allows precise fluid flow from the anode flowpath into the cathode flowpath. By such a valve configuration, in temperature regimes where water present in the system may be frozen, the orifice is responsive to the enhanced pressure of the slip stream fluid such that any frozen water situated on it is removed by a flexing action of the orifice in response to the passage of the slip stream through it.

According to yet another aspect of the present invention, a method for operating a fuel cell system is disclosed. The method includes configuring a valve to be fluidly cooperative with an anode flowpath and a cathode flowpath of the fuel cell system. The valve includes one or more actuation mechanisms and a flow controlling orifice. The method further includes passing a pressurized slip stream through the orifice such that in a temperature regime or related environmental condition where water present may be frozen, the orifice flexes in response to the enhanced pressure of the slip stream such that any frozen water remnants are removed by the flexing movement. In addition, a hydrogen-bearing fluid is introduced to the cathode flowpath from the anode flowpath through the valve. In a preferred form, this introduction takes place after the passage of the slip stream through the orifice in system startup, and before the passage of the slip stream through the orifice in operational conditions involving system shutdown.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention. Likewise, terms such as "substantially" are utilized to represent the inherent degree of uncertainty that may be attributed to any quantitative comparison, value, measurement, or other representation. It is also utilized to represent the degree by which a quantitative representation may vary from a stated reference without resulting in a change in the basic function of the subject matter at issue.

For the purposes of describing and defining the present invention it is noted that the term "device" is utilized herein to represent one or more components or combination of components, including those that may be part of a larger system or assembly. Furthermore, variations on the terms "automobile", "automotive", "vehicular" or the like are meant to be construed generically unless the context dictates otherwise. As such, reference to an automobile or vehicle will be understood to cover cars, trucks, buses, motorcycles and other similar modes of transportation unless more particularly recited in context.

In specific embodiments a slip stream comprises air that is of a temperature above the freezing temperature of water and a humidity of below twenty-percent. In specific embodiments it can vary depending on the outside humidity, the load on the system, and the type of compressor. Specific embodiments have drier conditions. In specific embodiments the compressor out is the absolute driest air in the system because 1) the system hasn't added any water yet, and 2) of the increased temperature has a stronger effect on decreasing RH than the effect of the higher pressure increasing the RH.

Embodiments described herein operate during startup. In specific embodiments the slip stream keeps the orifice clear of water during normal operation and shutdown so hydrogen to cathode can flow quickly into the next startup. Steps at start-up can include: starting with slip stream for a few seconds, which does flex the orifice and clears any residual ice left from uncleared water at shutdown; then the anode flow should warm up the stack, so, just a few seconds into startup, the 2-way valve opens (or the 3-way valve moves position). In specific embodiments without slip stream at the start, the anode flow should also clear the ice as it is a natural part of the startup to run the compressor before the hydrogen flow starts.

Having described embodiments of the invention in detail, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

In specific embodiments the metered quantities that can be, for example, about 0.5 to about 1 g/s of airflow. In other specific embodiments, the enhanced pressure can be from about 110 to about 170 kPa Absolute. In specific embodiments flexing occurs as ice builds, and the orifice enlarges, with the ice breaking free and pressure going back to normal levels.

In specific embodiments one or more of the methods, or devices or parts of devices can include or be produced by or can herein include one or more of: a device with an orifice integrally formed as a part of a three-way valve; an orifice disposed fluidly downstream of a valve in a conduit that is configured to convey said hydrogen-bearing from said valve to at least one cathode of a fuel cell system; a backflow-prevention valve disposed fluidly between a source of a slip stream fluid and orifice; a system further configured such that said slip stream fluid is delivered in a pressurized state relative to said hydrogen-bearing fluid; a system further configured such that said slip stream fluid is delivered through said orifice with a lower humidity than said hydrogen-bearing fluid; an orifice is disposed fluidly downstream of said actuation mechanism and not contained within a housing of said valve; at least one actuation mechanism comprises a linearly-movable plunger; at least one actuation mechanism comprises a rotatable plug; operating takes place during shutdown of said fuel cell system in said environmental condition where water present in at least one of said anode flowpath, cathode flowpath and valve is frozen; operating takes place during startup of said fuel cell system in said environmental condition where water present in at least one of said anode flowpath, cathode flowpath and valve is frozen; a slip stream comprises air that is of a temperature above the freezing temperature of water and a humidity of below twenty-percent; air being passed through an orifice is delivered from a compressor used to deliver a reactant to a cathode flowpath; a valve is a three-way valve; and or a device for improving fuel cell system startup or shutdown, said device comprising: a two-way valve comprising a check valve, and wherein the two-way valve is fluidly cooperative with at least one anode of said fuel cell system to receive to a hydrogen-bearing fluid therefrom, said valve configured to permit the selective passage of at least one of said hydrogen-bearing fluid and a pressurized slip stream fluid therethrough.

What is claimed is:

1. A fluid control device for a fuel cell system with at least one anode and at least one cathode, said device comprising:
   a three-way valve configured to fluidly couple with a cathode flow path of said at least one cathode and an anode flow path of said at least one anode, and to receive to a hydrogen-bearing fluid from said anode flow path, said valve being configured to permit selective passage of at least one of said hydrogen-bearing fluid and a pressurized slip stream fluid therethrough; and
   a flow-controlling orifice fluidly coupled to said three-way valve and configured to deliver a metered quantity of said hydrogen-bearing fluid and said slip stream fluid to said cathode flow path, said orifice having a flexible construction such that, when frozen water is present in said fuel cell system, said orifice responds to enhanced pressure of said slip stream fluid and removes frozen water situated thereon by a flexing action of said orifice in response to said passage of said slip stream fluid therethrough.

2. The device of claim 1, wherein said orifice is integrally formed as a part of said three-way valve.

3. The device of claim 1, wherein said orifice is disposed fluidly downstream of said three-way valve in a conduit that is configured to convey said hydrogen-bearing fluid from said valve to said at least one cathode of said fuel cell system.

4. The device of claim 3, further comprising a backflow-prevention valve disposed fluidly between a source of said slip stream fluid and said orifice.

5. A fuel cell system comprising:
   a fuel cell stack comprising a plurality of fuel cells each of which comprises an anode to accept a hydrogen-bearing fluid, a cathode to accept an oxygen-bearing fluid and a medium cooperative with said anode and said cathode to pass at least one catalytically-ionized reactant therebetween;
   an anode flow_path in fluid communication with said anode;
   a cathode flow_path in fluid communication with said cathode; and
   a three-way valve fluidly cooperative with said anode flow_path and said cathode flow_path, said valve comprising:
      at least one actuation mechanism to establish selective introduction of said hydrogen-bearing fluid from said anode flow_path into said cathode flow_path; and
      a flow controlling orifice configured to control anode flow into said cathode flow_path such that in an environmental condition where water present in said flow_path and said valve may be frozen, said orifice is responsive to the enhanced pressure of said slip stream fluid such that any frozen water situated thereon is removed by a flexing action of said orifice in response to said passage of said slip stream fluid therethrough.

6. The system of claim 5, wherein said system is further configured such that said slip stream fluid is delivered in a pressurized state relative to said hydrogen-bearing fluid.

7. The system of claim 5, wherein said system is further configured such that said slip stream fluid is delivered through said orifice with a lower humidity than said hydrogen-bearing fluid.

8. The system of claim 5, wherein said orifice is disposed fluidly downstream of said actuation mechanism and not contained within a housing of said valve.

9. The system of claim 5, wherein said at least one actuation mechanism comprises a linearly-movable plunger.

10. The system of claim 5, wherein said at least one actuation mechanism comprises a rotatable plug.

11. A method of operating a fuel cell system, said method comprising:
   configuring a valve to be fluidly cooperative with an anode flow_path and a cathode flow_path of said fuel cell system, said valve comprising at least one actuation mechanism and a flow controlling orifice;
   passing a pressurized slip stream through said orifice such that in an environmental condition where water present in at least one of said anode flow_path, cathode flow_path and valve may be frozen, said orifice flexes in response to the enhanced pressure of said slip stream such that any frozen water situated thereon is removed by said flexing; and
   introducing a hydrogen-bearing fluid to said cathode flow_path from said anode flow_path through said at least one actuation mechanism and said orifice.

12. The method of claim 11, wherein said operating takes place during shutdown of said fuel cell system in said environmental condition where water present in at least one of said anode flow_path, cathode flow_path and valve is frozen.

13. The method of claim 11, wherein said operating takes place during startup of said fuel cell system in said environmental condition where water present in at least one of said anode flow_path, cathode flow_path and valve is frozen.

14. The method of claim 11, wherein said slip stream comprises air that is of a temperature above the freezing temperature of water and a humidity of below twenty-percent.

15. The method of claim 14, wherein said air being passed through said orifice is delivered from a compressor used to deliver a reactant to said cathode flow_path.

16. The method of claim 11, wherein said valve is a three-way valve.

17. The device of claim 1, wherein the valve includes an electrically actuated solenoid valve with an inlet orifice fluidly coupled to the anode flow path, an outlet conduit fluidly coupled to the cathode flow path, and a pintle configured to selectively press against the orifice and thereby restrict flow of the hydrogen-bearing fluid from the anode flow path to the cathode flow path.

18. The device of claim 17, wherein the pintle is connected to a spring-biased plunger configured to translate rectilinearly away from the orifice in response to an electric current passing through a coil.

19. The device of claim 1, further comprising compressor configured to deliver said slip stream fluid with a higher pressure and a lower humidity than said hydrogen-bearing fluid.

20. The device of claim 19, further comprising a slip stream conduit configured to receive the slip stream fluid from the compressor, the slip stream conduit being fluidly downstream from the anode flow pack and fluidly upstream from the cathode flow path.

* * * * *